L. F. THORN.
COTTER PIN.
APPLICATION FILED SEPT. 10, 1920.
1,408,487. Patented Mar. 7, 1922.
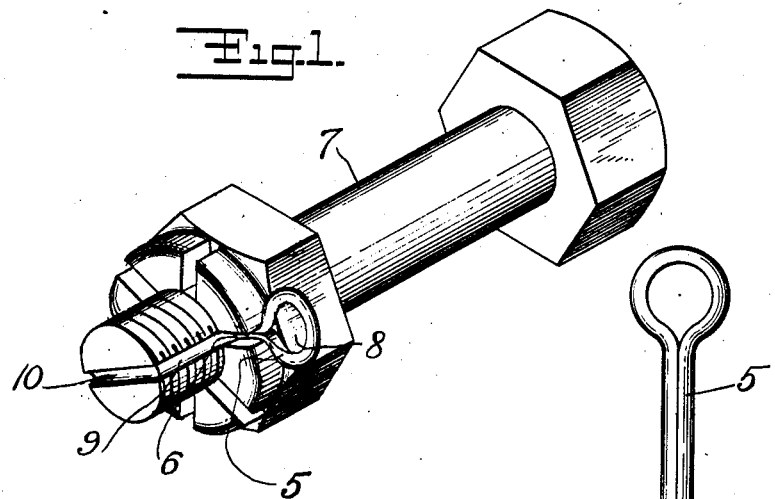
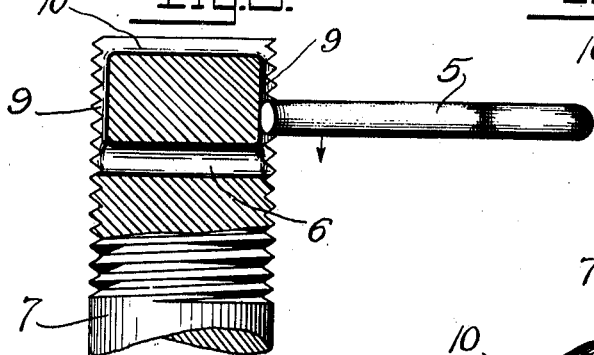 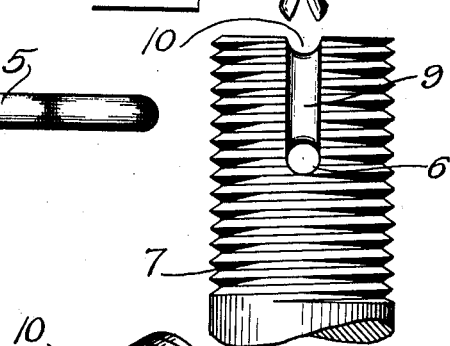
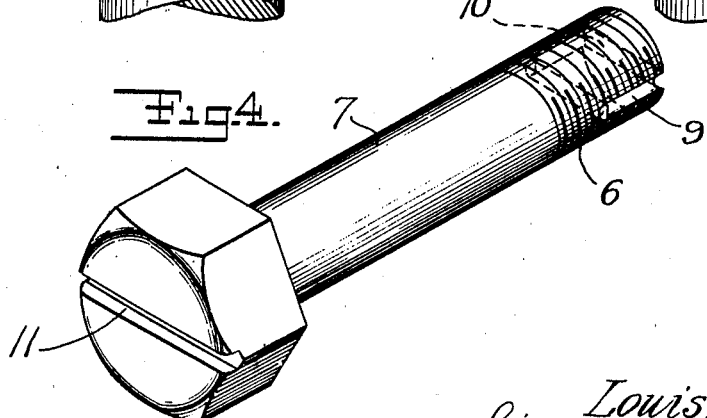
Inventor
Louis F. Thorn
By his Attorney
E. W. Marshall

UNITED STATES PATENT OFFICE.

LOUIS F. THORN, OF YONKERS, NEW YORK.

COTTER PIN.

1,408,487. Specification of Letters Patent. Patented Mar. 7, 1922.

Application filed September 10, 1920. Serial No. 409,345.

*To all whom it may concern:*

Be it known that I, LOUIS F. THORN, a citizen of the United States, and a resident of Yonkers, Westchester County, and State of New York, have invented certain new and useful Improvements in Cotter Pins, of which the following is a specification.

My invention relates to fastenings of the cotter pin type, and the objects of the invention are to provide a simple and practical guide for assisting in the proper placing of the cotter pin.

In the accompanying drawing I have illustrated the invention embodied in one of its simplest and most practical forms, but wish it understood that certain modifications may be made in the structure without departure from the true spirit and scope of the invention as herein defined and claimed.

In the drawing referred to:

Figure 1 is a perspective view of the invention as applied to an ordinary screw bolt.

Figure 2 is is a broken detail view, illustrating the end portion of the bolt and the cotter pin about to be applied thereto.

Figure 3 is a similar view with the bolt shown in section and illustrating the method of guiding the cotter pin to its seat.

Figure 4 is a rear end view of the bolt.

The cotter pin which is designated 5 is of the usual split spring type, which after being passed through the hole 6 provided therefor in the bolt or other element 7, is spread or turned out to lock it in place. This pin may serve for securing a nut 8 or other element in place on the bolt.

The cotter pin is guided to its seat, in my invention, by means of a slot or groove 9 cut in the side of the bolt and extending usually from the end of the bolt directly to the cotter pin hole. This groove is preferably of a width to take the split end of the pin and to therefore operate as a guide for directing the pin into the hole provided therefor. This guiding groove may be semicircular in cross section so as to exert a compressive force on the split end of the pin, and to thereby bring the split portions together into condition to pass readily into the hole.

In the illustration, two guiding grooves are provided one at each side of the bolt and opening into the opposite ends of the cotter pin hole. This enables the cotter pin to be readily inserted into either end of the hole.

An additional feature, in the construction illustrated, is a cross groove 10 extending transversely of the end of the bolt and connecting the outer ends of the two guide grooves 9. This transverse groove is shown as arranged in alinement with the cotter pin hole so as to serve as a visual indication of the position of the cotter pin hole as well as a supplementary guide for assisting in the engagement of the cotter pin in either one of the grooves 9 in the side of the bolt.

The invention is particularly useful in aiding the setting of the cotter pin in the dark or inaccessible positions, it being evident that it is merely necessary to engage the point of the cotter pin in one of the grooves and to then slide the pin along in the groove until it enters the seat provided to receive it.

An additional guide may be provided by forming the head of the bolt with a cross slot 11 in the exposed end face thereof in register with the cotter pin hole 6. When the head of the bolt is in an exposed position, this gives an indication to the operator of the position of the cotter pin hole and, therefore, enables him to more readily locate the cotter pin guiding grooves.

What I claim is:

1. A bolt or other element having a transverse bore to receive a cotter pin and provided with a guiding groove in the side of the same extending to the end of said bore and of a width to receive the end of a cotter pin designed to fit said bore.

2. A bolt or other element having a transverse bore to receive a cotter pin and provided with a guiding groove in the side of the same extending to the end of said bore and of a width to receive the end of a cotter pin designed to fit said bore, said guiding groove extending from substantially the end of the bolt or other element and substantially longitudinally of the same.

3. A bolt or other element provided with a transverse cotter pin hole therethrough and with cotter pin receiving and guiding groove in the sides thereof extending to the opposite ends of said hole.

4. A bolt or other element provided with a transverse cotter pin receiving hole therethrough and with guiding grooves for the ends of a cotter pin extending from the end along the opposite sides of the bolt or other element to the opposite ends of said hole and a supplementary cotter pin receiving and guiding groove extending across the end of the bolt or other element and connecting the ends of said side grooves.

5. A bolt or other element provided with a transverse cotter pin receiving hole and with a guiding groove for the end of a cotter pin extending along the side of the bolt to the end of said hole, said guiding groove being substantially semi-cylindrical in cross section and of a width substantially equal to the diameter of the hole to thereby guide and compress the split end of a cotter pin intended to seat in the hole.

6. A headed bolt or other element having a transverse cotter pin hole therethrough and provided with a transverse receiving and guiding groove on the exposed end of the bolt in register with said hole, said bolt further having a guiding groove in the side thereof to receive the end of a cotter pin and extending from an end of said transverse groove to one end of the cotter pin hole.

In witness whereof I have hereunto set my hand this 27 day of Aug., 1920.

LOUIS F. THORN.